United States Patent
Araki

(10) Patent No.: US 9,261,947 B2
(45) Date of Patent: Feb. 16, 2016

(54) DEVICE AND POWER SAVING CONTROL METHOD FOR SELECTIVELY TRANSITIONING TO ONE OR MORE LOW POWER MODES DEPENDING ON WHETHER ALL OF THE PROGRAMS ON THE DEVICE HAVE BEEN INTERRUPTED OR TERMINATED

(75) Inventor: Ryoji Araki, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 444 days.

(21) Appl. No.: 13/369,529

(22) Filed: Feb. 9, 2012

(65) Prior Publication Data
US 2012/0216062 A1    Aug. 23, 2012

(30) Foreign Application Priority Data

Feb. 23, 2011  (JP) ................. 2011-036883
Dec. 21, 2011  (JP) ................. 2011-279507

(51) Int. Cl.
*G06F 1/00* (2006.01)
*G06F 1/32* (2006.01)

(52) U.S. Cl.
CPC ........... *G06F 1/3284* (2013.01); *Y02B 60/1267* (2013.01)

(58) Field of Classification Search
CPC .................................................. G06F 1/3203
USPC ......................................................... 713/323
See application file for complete search history.

(56) References Cited

U.S. PATENT DOCUMENTS

| | | | | |
|---|---|---|---|---|
| 6,678,831 B1 * | 1/2004 | Mustafa et al. | ............... | 713/320 |
| 8,046,617 B2 * | 10/2011 | Fleck et al. | .................. | 713/324 |
| 8,543,854 B1 * | 9/2013 | Ilan et al. | ...................... | 713/323 |
| 2005/0251697 A1 * | 11/2005 | Narukawa et al. | ............ | 713/310 |
| 2007/0050532 A1 * | 3/2007 | Ochiai | ......................... | 711/100 |
| 2007/0234084 A1 * | 10/2007 | Furuta | ........................... | 713/300 |
| 2007/0260337 A1 | 11/2007 | Sugiyama | | |
| 2008/0288802 A1 * | 11/2008 | Fleck et al. | .................. | 713/324 |
| 2009/0011791 A1 * | 1/2009 | Tashiro | ...................... | 455/550.1 |
| 2009/0083560 A1 * | 3/2009 | O'Connell et al. | ........... | 713/323 |

FOREIGN PATENT DOCUMENTS

| | | |
|---|---|---|
| JP | 2000-075953 | 3/2000 |
| JP | 2002-351679 | 12/2002 |
| JP | 2006-050251 | 2/2006 |
| JP | 2007-152824 | 6/2007 |
| JP | 2007-301977 | 11/2007 |
| JP | 2008-233922 | 10/2008 |
| JP | 2010-122448 | 6/2010 |

OTHER PUBLICATIONS

Japanese Office Action dated Oct. 6, 2015.

* cited by examiner

*Primary Examiner* — Thomas Lee
*Assistant Examiner* — Robert Cassity
(74) *Attorney, Agent, or Firm* — IPUSA, PLLC

(57) ABSTRACT

A device having at least one power-saving mode includes a storage unit configured to store a program; an advance notification unit configured to send, to the program, an advance notice of transition to the power-saving mode prior to transition start timing at which the transition to the power-saving mode is started; a transition determining unit configured to query the program, at the transition start timing, whether the transition to the power-saving mode is acceptable; and a transition control unit configured to cause the device to transition to the power saving mode if the transition to the power-saving mode is acceptable for the queried program.

6 Claims, 8 Drawing Sheets

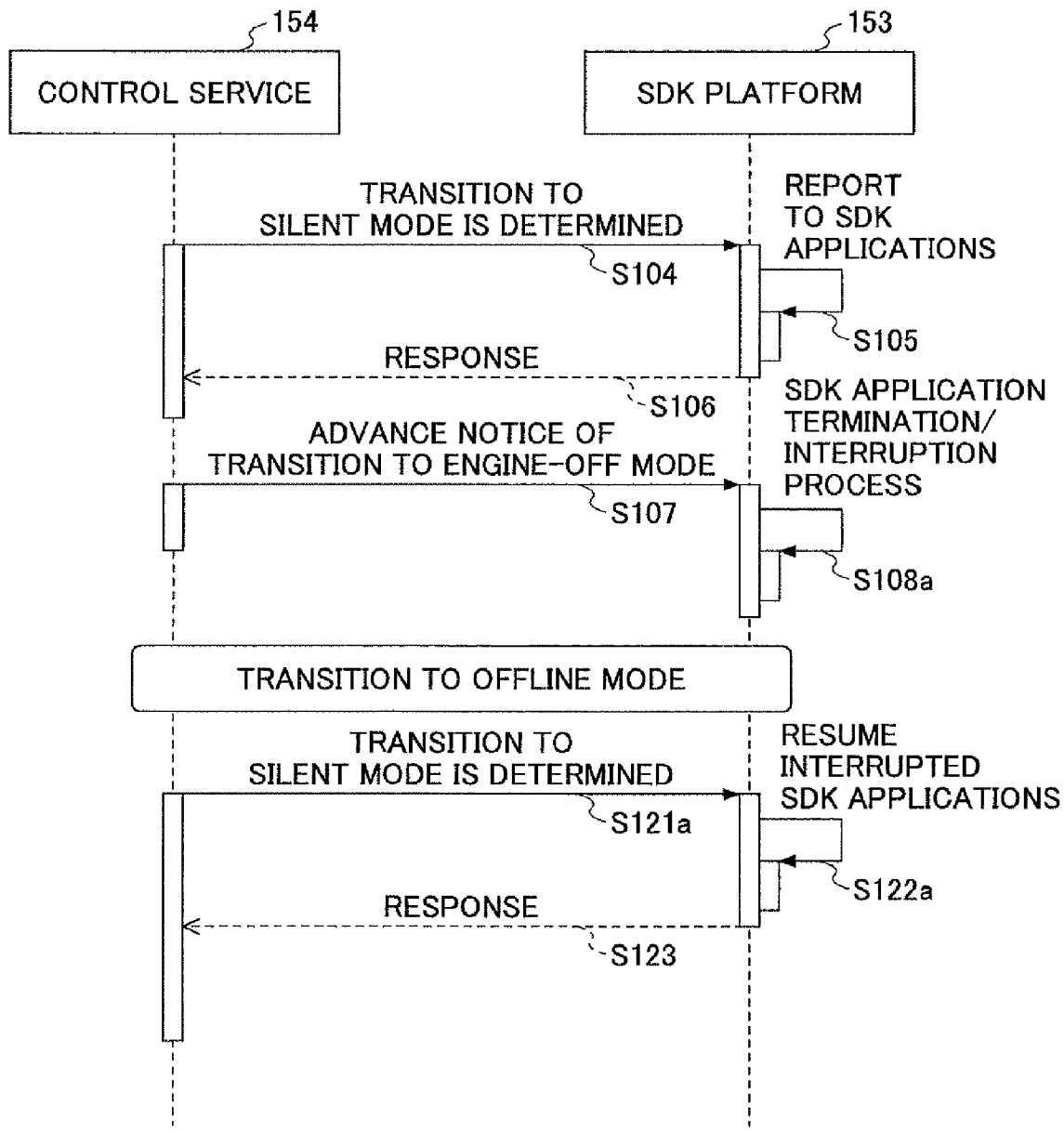

DEVICE AND POWER SAVING CONTROL METHOD FOR SELECTIVELY TRANSITIONING TO ONE OR MORE LOW POWER MODES DEPENDING ON WHETHER ALL OF THE PROGRAMS ON THE DEVICE HAVE BEEN INTERRUPTED OR TERMINATED

CROSS-REFERENCE TO RELATED APPLICATIONS

The present application is based upon and claims the benefit of priority of Japanese Patent Application No. 2011-036883 filed on Feb. 23, 2011 and Japanese Patent Application No. 2011-279507 filed on Dec. 21, 2011, the entire contents of which are incorporated herein by reference.

BACKGROUND OF THE INVENTION

1. Field of the Invention

An aspect of this disclosure relates to a device, a power-saving control method, and a storage medium.

2. Description of the Related Art

There exist devices that transition (or switch) to a power-saving mode (or energy-saving mode) to save power when, for example, the devices are not operated for a predetermined period of time. Examples of such devices include image forming devices like a printer, a facsimile machine, a copier, and a multifunction peripheral. Also, there is an image forming device where components (e.g., programs) running on the image forming device are queried to determine whether transition to the power-saving mode is acceptable for the components (see, for example, Japanese Laid-Open Patent Publication No. 2007-152824). The image forming device transitions to the power-saving mode only if it is acceptable to the components. This configuration makes it possible to prevent malfunction of the components and damage to data being processed by the components, which may occur as a result of an abrupt transition to the power-saving mode.

Meanwhile, there is an image forming device where functions can be added after the factory shipment by installing application programs that can be developed using public application programming interfaces (APIs). In such an image forming device, a large number of application programs may be running depending on the needs of the user.

Here, an increase in the number of application programs running on a device such as an image forming device indicates an increase in the number of objects to be queried to determine whether to transition to the power-saving mode. That is, it is necessary to query all installed application programs to determine whether transition to the power-saving mode is acceptable. Accordingly, if the number of objects to be queried increases, the time necessary to determine whether to switch to the power-saving mode increases. This may result in a delay in switching to the power-saving mode and may reduce the power-saving efficiency.

SUMMARY OF THE INVENTION

In an aspect of this disclosure, there is provided a device having at least one power-saving mode. The device includes a storage unit configured to store a program; an advance notification unit configured to send, to the program, an advance notice of transition to the power-saving mode prior to transition start timing at which the transition to the power-saving mode is started; a transition determining unit configured to query the program, at the transition start timing, whether the transition to the power-saving mode is acceptable; and a transition control unit configured to cause the device to transition to the power saving mode if the transition to the power-saving mode is acceptable for the queried program.

BRIEF DESCRIPTION OF THE DRAWINGS

FIG. 8 is a sequence chart illustrating an exemplary process according to a fifth embodiment.

DESCRIPTION OF THE PREFERRED EMBODIMENTS

Figure 1:
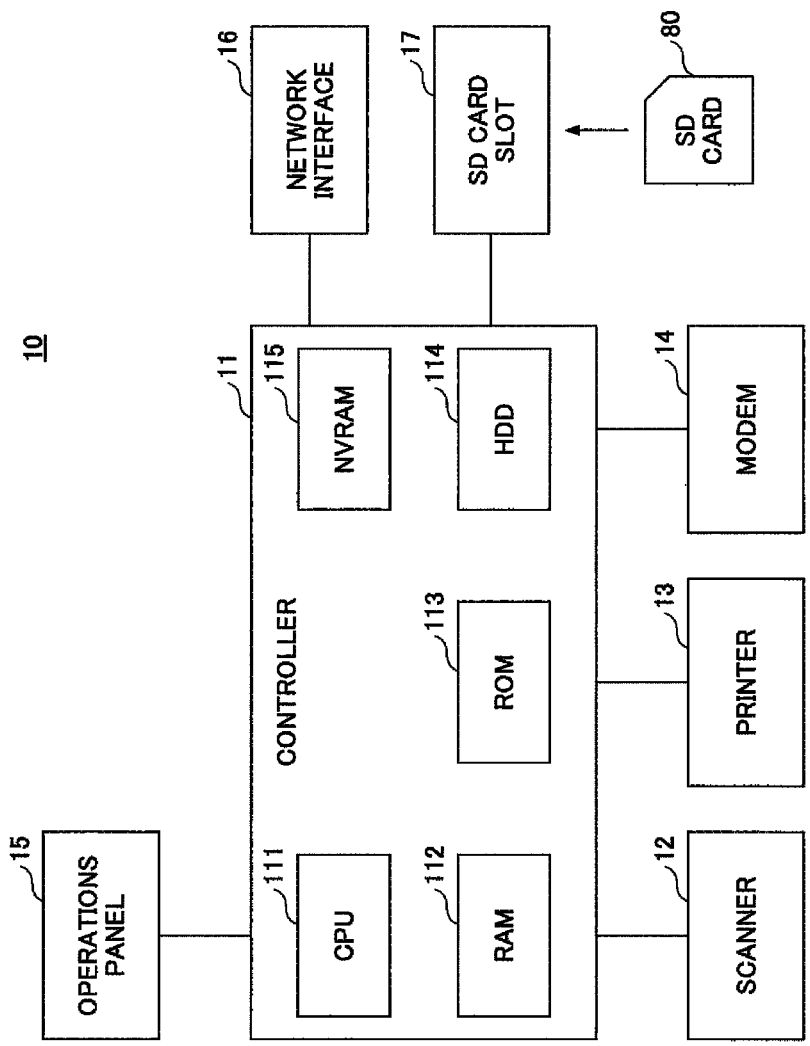
FIG. 1 is a block diagram illustrating an exemplary hardware configuration of an image forming device.

Preferred embodiments of the present invention are described below with reference to the accompanying drawings. FIG. 1 is a block diagram illustrating an exemplary hardware configuration of an image forming device 10 according to an embodiment. As illustrated in FIG. 1, the image forming device 10 may include, as hardware components, a controller 11, a scanner 12, a printer 13, a modem 14, an operations panel 15, a network interface 16, and a secure digital (SD) card slot 17.

The controller 11 may include a central processing unit (CPU) 111, a random access memory (RAM) 112, a read-only memory (ROM) 113, a hard disk drive (HDD) 114, and a non-volatile RAM (NVRAM) 115. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs. The NVRAM 115 stores, for example, various settings.

The RAM 112, the HDD 114, and the NVRAM 115 are examples of storage units.

The scanner 12 is a hardware component (image scanning unit) for scanning a document to obtain image data. The printer 13 is a hardware component (printing unit) for printing print data on a recording medium such as paper. The modem 14 is a hardware component for connecting the image forming device 10 to a telephone line and is used to send and receive image data for facsimile communications. The operations panel 15 is a hardware component including an input unit such as buttons for receiving user inputs, and a display unit such as a liquid crystal display panel. The network interface 16 is a hardware component for connecting the image forming device 10 to a (wired or wireless) network such as a local area network (LAN). The SD card slot 17 reads, for example, programs stored in a secure digital (SD) card 80. With the image forming device 10 configured as described above, in addition to the programs stored in the ROM 113 and the HDD 114, programs stored in the SD card 80 can be loaded into the RAM 112 and executed.

Figure 2:
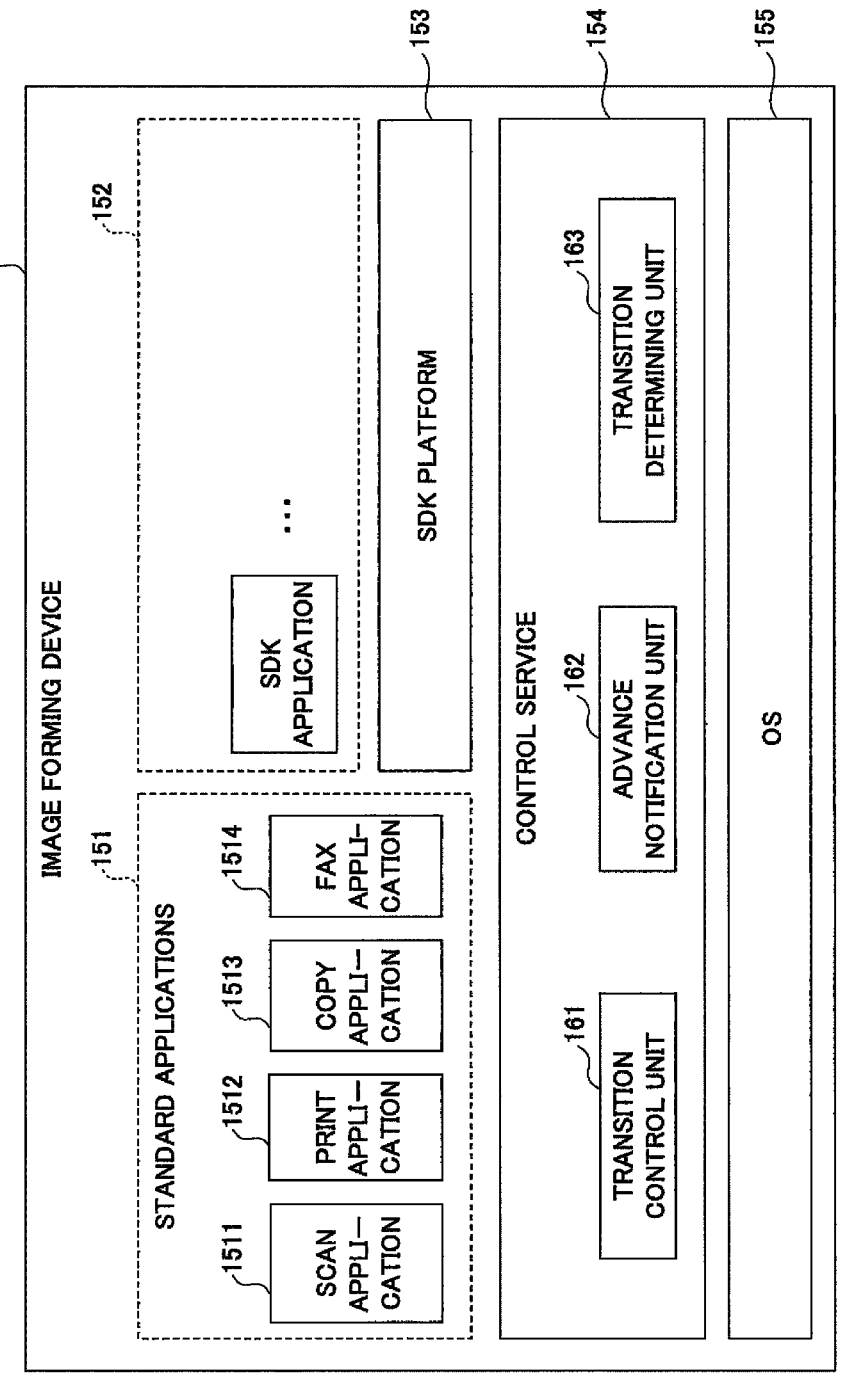
FIG. 2 is a drawing illustrating an exemplary software configuration of an image forming device.

FIG. 2 is a drawing illustrating an exemplary software configuration of the image forming device 10. As illustrated in FIG. 2, the image forming device 10 may include standard applications 151, SDK applications 152, an SDK platform 153, a control service 154, and an OS 155.

The standard applications 151 are default applications installed in the image forming device 10 before the factory shipment. In the example of FIG. 2, the standard applications 151 include a scan application 1511, a print application 1512, a copy application 1513, and a fax application 1514. The scan application 1511 performs a scan job. The print application 1512 performs a print job. The copy application 1513 performs a copy job. The fax application 1514 performs a facsimile transmission job and a facsimile reception job.

The control service 154 is implemented by software modules that, for example, provide functions for controlling various hardware resources to upper-layer applications and perform fundamental functions of the image forming device 10. Also in FIG. 2, the control service 154 may include a transition control unit 161, an advance notification unit 162, and a transition determining unit 163.

The transition control unit 161 controls transition to power-saving modes (energy-saving modes or power-saving states). In the power-saving modes, power consumption of the image forming device 10 is reduced. For example, in the power-saving modes, supply of power to the operations panel 15 may be stopped or reduced, or supply of power to "engines" such as the scanner 12 and the printer 13 may be stopped or reduced.

The advance notification unit 162 sends an advance notice of transition to a power-saving mode to programs (e.g., the standard applications 151, the SDK applications 152, and the SDK platform 153) running on the image forming device 10 prior to the timing (transition start timing) to start transition to the power-saving mode. The transition start timing may be determined according to the specifications of the image forming device 10. For example, the image forming device 10 may start transition to a power-saving mode if the image forming device 10 is not operated for a predetermined period of time, and this timing may be called the transition start timing.

At the transition start timing, the transition determining unit 163 queries programs running on the image forming device 10 to determine whether transition to the power saving mode is acceptable for the programs. This makes it possible to prevent malfunction of the programs and damage to data being processed by the programs, which may occur as a result of an abrupt transition to the power-saving mode.

The SDK applications 152 (may sometimes be referred to in their singular form for descriptive purposes) are plug-in applications that are additionally installed to add functions to the image forming device 10 after its factory shipment. Applications implementing any appropriate functions may be provided as the SDK applications 152. The SDK applications 152 may be installed, for example, via the SD card 80 or a network into the image forming device 10.

The SDK platform 153 provides an execution environment for the SDK applications 152. The SDK applications 152 are developed using application programming interfaces (API) provided by the SDK platform 153. For example, the SDK platform 153 provides the SDK applications 152 with a scan function interface, a print function interface, and a copy function interface. APIs provided by the SDK platform 153 may be made public to allow a third party to develop the SDK applications 152. Since the APIs are machine-independent it is generally not necessary to modify the SDK applications 152 for different types (or models) of image forming devices.

Programs that can be installed into the image forming device 10 are not limited to the SDK applications 152 and the SDK platform 153 that are provided as examples in the present embodiment. Any appropriate programs may be additionally installed into the image forming device 10.

The OS 155 is an operating system. Software programs in the image forming device 10 run as processes or threads on the OS 155.

Figure 3:
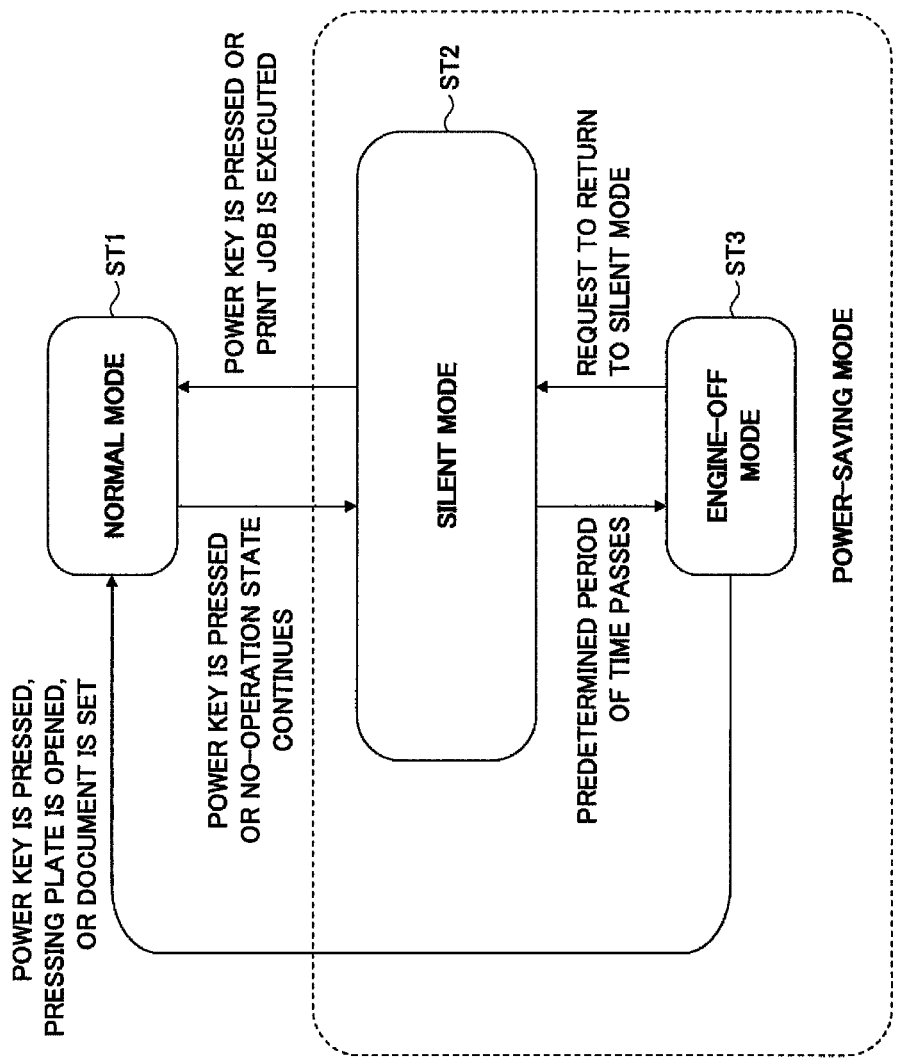
FIG. 3 is a drawing used to describe how an image forming device transitions to power-saving modes.

Next, exemplary power-saving modes of the image forming device 10 are described. FIG. 3 is a drawing used to describe how the image forming device 10 transitions to power-saving modes.

In FIG. 3, a normal mode ST1 indicates a non-power-saving mode where the power consumption of the image forming device 10 is not reduced. When the image forming device 10 is in the normal mode ST1, the user can use the image forming device 10 without any wait time. For example, in the normal mode ST1, when the power key is pressed or the image forming device 10 is not operated for a predetermined period of time, the image forming device 10 transitions (or switches) to a silent mode ST2.

The silent mode ST2 is an example of a power-saving mode. For example, in the silent mode ST2, a supply of power to the operations panel 15 may be stopped or reduced. In the silent mode ST2, however, the standard applications 151, the SDK applications 152, and the SDK platform 153 are still running (or active). The power key is, for example, a hardware key (such as a button) that is disposed on the operations panel 15 and allows that user to manually switch operational modes of the image forming device 10.

For example, in the silent mode ST2, when the power key is pressed or a print job is started in response to print data received via a network, the image forming device 10 returns to the normal mode ST1. Meanwhile, when the silent mode ST2 continues for a predetermined period of time (hereafter, may be called "engine-off mode wait time"), the image forming device 10 transitions (or switches) to an engine-off mode ST3.

The engine-off mode ST3 is also an example of a power-saving mode. However, the silent mode ST2 and the engine-off mode ST3 have different power-saving levels. In the engine-off mode ST3, the power consumption of the image forming device 10 is reduced further than in the silent mode ST2 (i.e., the engine-off mode ST3 has a higher power-saving efficiency). For example, in the engine-off mode ST3, supply of power to "engines" such as the scanner 12 and the printer 13 may be stopped or reduced. Also in the engine-off mode ST3, the SDK applications 152 may be terminated. Further, in the engine-off mode, supply of power to the HDD 114 and/or the NVRAM 115 may be stopped or reduced.

For example, in the engine-off mode ST3, when the power key is pressed, a pressing plate is opened, or a document to be scanned or copied is set on a document feeder (DF), the image forming device 10 transitions (or switches) to the normal mode ST1.

The power-saving modes and transition between the power-saving modes illustrated in FIG. 3 are just examples. Any other power-saving modes and events triggering transition between them may also be defined in an image forming device. The normal mode ST1, the silent mode ST2, and the engine-off mode ST3 may be collectively called operational modes.

Figure 4:
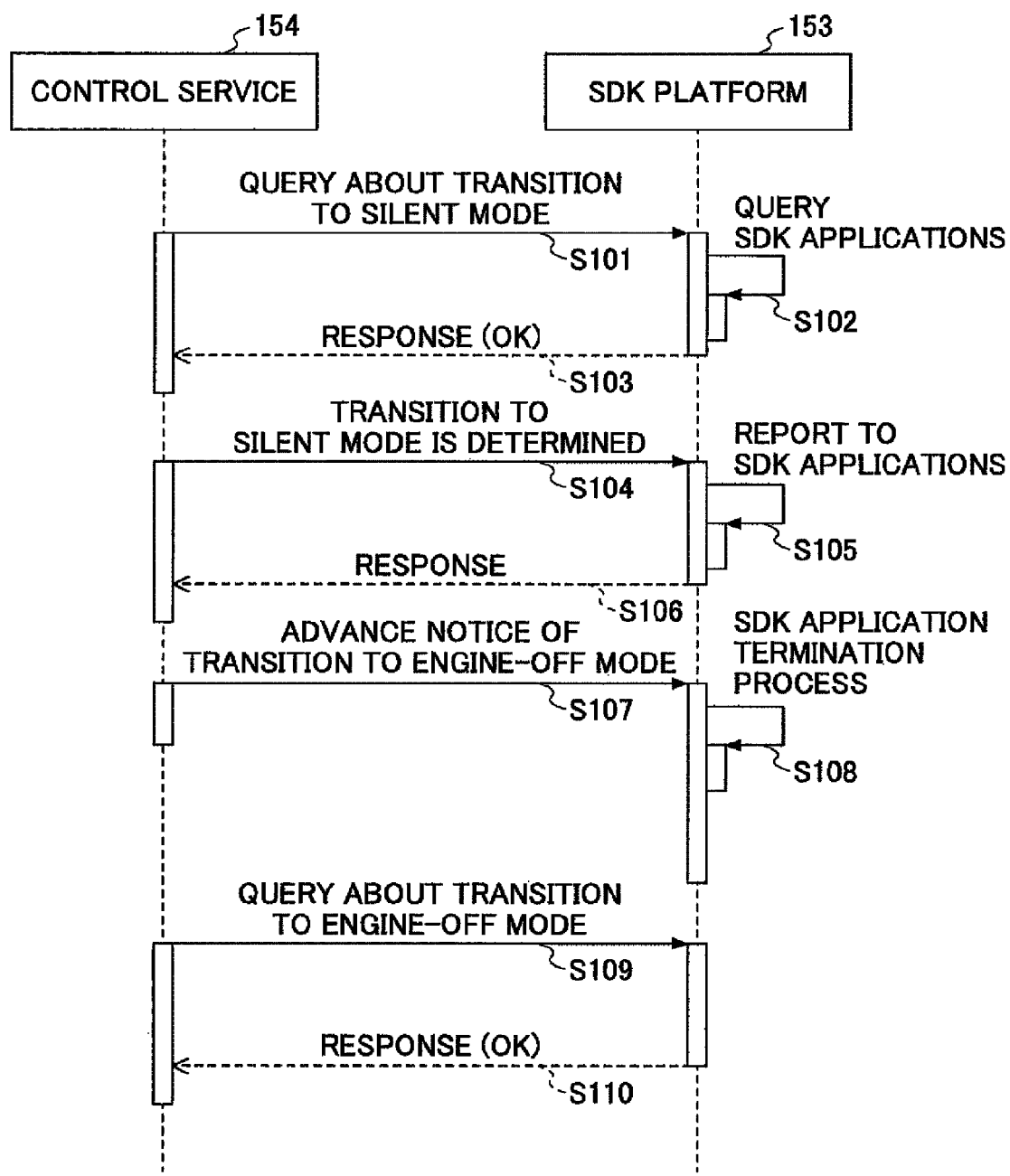
FIG. 4 is a sequence chart illustrating an exemplary process according to a first embodiment.

An exemplary process performed by the image forming device 10 is described below. FIG. 4 is a sequence chart illustrating an exemplary process according to a first embodiment.

If the image forming device 10 is not operated for a predetermined period of time or the power key is pressed while the image forming device 10 is in the normal mode ST1, the transition control unit 161 queries the SDK platform 153 whether transition to the silent mode ST2 is acceptable (or allowed) (S101). When queried, the SDK platform 153 queries the SDK applications 152 running on the SDK platform 153 whether transition to the silent mode ST2 is acceptable (S102). Since transition to the silent mode ST2 does not extensively affect the SDK applications 152, the SDK applications 152 immediately return responses to the query.

Next, the SDK platform 153 sends a response, which indicates whether transition to the silent mode ST2 is acceptable, to the transition control unit 161. For example, when receiving responses indicating that transition to the silent mode ST2 is acceptable (or allowed) from all the queried SDK applications 152, the SDK platform 153 returns a response indicating that the transition is acceptable. Meanwhile, when receiving a response indicating that transition to the silent mode ST2 is not acceptable (or not allowed) from at least one of the queried SDK applications 152, the SDK platform 153 returns a response indicating that the transition is not acceptable.

When receiving a response indicating that the transition is acceptable, the transition control unit 161 reports to the SDK platform 153 that transition to the silent mode ST2 has been determined (S104). In response to the report from the transition control unit 161, the SDK platform 153 reports, to the running SDK applications 152, that transition to the silent mode ST2 has been determined (S105). As a result, the SDK applications 152 recognize that transition to the silent mode ST2 has been determined. Since the SDK applications 152 are queried separately in step S102, each SDK application 152 does not know how other SDK applications 152 responded to the query. Therefore, SDK applications 152 that have sent responses indicating that the transition is acceptable are not able to determine whether transition to the silent mode ST2 is to actually be performed. For this reason, the SDK platform 153 reports to the SDK applications 152 that transition to the silent mode ST2 has been determined.

Next, the SDK platform 153 sends a response to the report to the transition control unit 161 (S106). When receiving the response from the SDK platform 153, the transition control unit 161 causes the image forming device 10 to transition to the silent mode ST2.

Meanwhile, if a response indicating that the transition is not acceptable is received in step S103, the transition control unit 161 reports to the SDK platform 153 that transition to the silent mode ST2 has been cancelled. In this case, the SDK platform 153 reports to the running SDK applications 152 that transition to the silent mode ST2 has been cancelled.

After transition to the silent mode ST2 and a predetermined period of time (e.g., 10 s) before the end of the engine-off mode wait time (i.e., when "engine-off mode wait time−predetermined period of time" passes), the advance notification unit 162 sends, to the SDK platform 153, an advance notice of transition to the engine-off mode ST3 (S107). The period of time represented by "engine-off mode wait time−predetermined period of time" may be called a first time period and the engine-off mode wait time may be called a second time period.

In response to the advance notice, the SDK platform 153 performs a termination process for terminating the running SDK applications 152 (S108). In this sense, the SDK platform 153 may be called a terminating unit. For example, the SDK platform 153 inputs a termination command to each of the SDK applications 152. In response to the termination command, the SDK applications 152 perform end processes. The end processes may vary depending on the SDK applications 152. For example, an SDK application 152 releases resources such as memory and record a log before the thread of the SDK application 152 is terminated. Accordingly, an end process of an SDK application 152 may take several seconds.

When the engine-off mode wait time passes after transition to the silent mode ST2 (or when the predetermined period of time, e.g., 10 s, passes after the advance notice is sent), the transition determining unit 163 queries the SDK platform 153 whether transition to the engine-off mode ST3 is acceptable (S109). After completing the termination process for the SDK applications 152 which has been started in response to the advance notice (i.e., after terminating all SDK applications 152), the SDK platform 153 sends a response to the query which indicates that transition to the engine-off mode ST3 is acceptable (S110). When receiving the response from the SDK platform 153, the transition control unit 161 causes the image forming device 10 to transition to the engine-off mode ST3.

As described above, according to the first embodiment, an advance notice is sent to the SDK platform 153 before transition to the engine-off mode ST3 is started (i.e., before querying the SDK platform 153 in step S109). This configuration or method enables the SDK platform 153 to start the termination process for terminating the SDK applications 152 before the transition to the engine-off mode ST3 is actually started. This in turn makes it possible to reduce the time necessary for the SDK platform 153 to respond in step S110 to the query made in step S109. That is, if the termination process has been completed for all the SDK applications 152 (or if the end processes of all the SDK applications 152 have been completed) when the SDK platform 153 is queried in step S109, the SDK platform 153 can respond immediately in step S110. Also, even if the termination process has not been completed for some of the SDK applications 152 (or the end processes of some of the SDK applications 152 have not been completed) when the SDK platform 153 is queried in step S109, the time necessary for the SDK platform 153 to respond to the query can still be reduced. Thus, compared with a case where the termination process for terminating the SDK applications 152 is started in response to the query in step S109, the method of FIG. 4 can reduce the time necessary for the SDK platform 153 to respond to the query. This in turn makes it possible to prevent reduction in the power-saving efficiency due to the increase in the number of SDK applications 152.

A second embodiment is described below. Here, mainly steps and configurations that are different from the first embodiment are described. Accordingly, steps and configurations of the second embodiment not described below may be substantially the same as those of the first embodiment.

Figure 5:
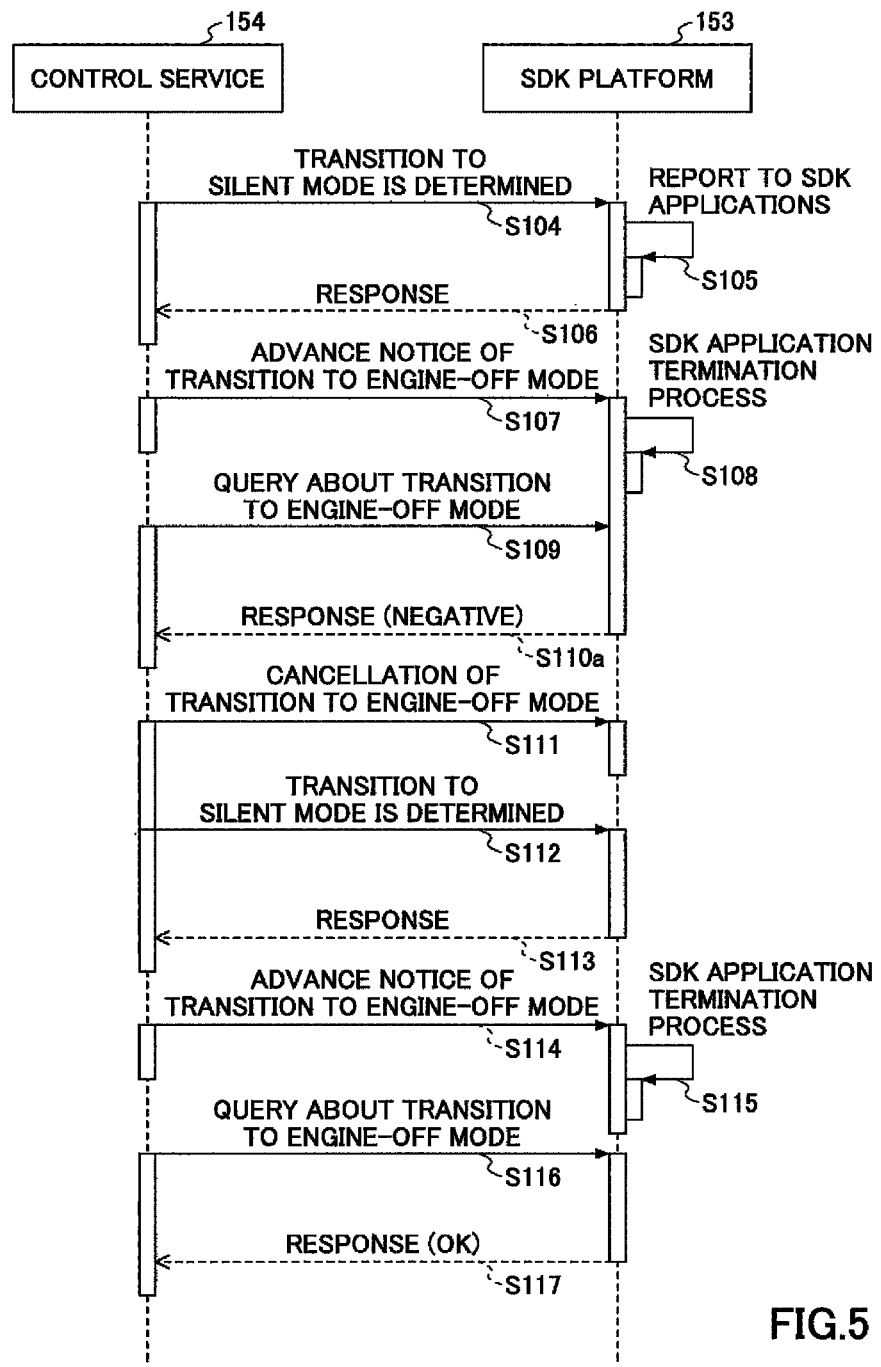
FIG. 5 is a sequence chart illustrating an exemplary process according to a second embodiment.

FIG. 5 is a sequence chart illustrating an exemplary process according to the second embodiment. The same reference numbers as in FIG. 4 are assigned to the corresponding steps in FIG. 5, so that descriptions of those steps are omitted. Also in FIG. 5, steps S101 through S103 are omitted for brevity.

In the second embodiment, if the termination process has not been completed for at least one of the SDK applications 152 when the SDK platform 153 is queried in step S109, the SDK platform 153 immediately sends a response indicating that the transition is not acceptable (or not allowed) (S110a).

When receiving the response, the transition control unit 161 reports to the SDK platform 153 that transition to the engine-off mode ST3 has been cancelled (S111). Next, the transition control unit 161 reports to the SDK platform 153 that transition to the silent mode ST2 has been determined (S112). In other words, the transition control unit 161 reports to the SDK platform 153 that the silent mode ST2 is maintained since transition to the engine-off mode ST3 has been cancelled. If the termination command has not been input to one or more SDK applications 152 at the time when the report is received, the SDK platform 153 stops inputting the termination command, and reports to the (still running) SDK applications 152 that transition to the silent mode ST2 has been determined. At this time, the SDK applications 152 to which the termination command has already been input (or the SDK applications 152 that have been terminated) are not restarted. Instead, these SDK applications 152 are restarted, for example, when the image forming device 10 returns to the normal mode ST1.

Following step S112, the SDK platform 153 sends a response to the report (S113). Then, after a predetermined period of time from when the determination of transition to the silent mode ST2 is reported in step S112 or from when the response is sent in step S113, the advance notification unit 162 again sends, to the SDK platform 153, an advance notice of transition to the engine-off mode ST3 (S114).

In response to the advance notice, the SDK platform 153 resumes the termination process for terminating the SDK applications 152 (S115). That is, the SDK platform 153 inputs the termination command to the remaining SDK applications 152. Here, if the termination process has already been completed for all the SDK applications 152 when the advance notice is received, step S115 may be omitted.

When a predetermined period of time passes after the advance notice is sent in step S114, the transition determining unit 163 queries the SDK platform 153 as to whether transition to the engine-off mode ST3 is acceptable (S116). If the termination process for all the SDK applications 152 has been completed when the SDK platform 153 is queried in step S116, the SDK platform 153 sends a response indicating that transition to the engine-off mode ST3 is acceptable (S117).

The second embodiment provides advantageous effects similar to those provided by the first embodiment. In the second embodiment, the time from when the cancellation of transition to the engine-off mode ST2 is reported (S111) to when the SDK platform 153 is queried again whether transition to the engine-off mode ST3 is acceptable (S116) is preferably less than the time necessary to terminate all running SDK applications 152.

A third embodiment is described below. Here, steps and configurations that are different from the first and second embodiments are mainly described. Accordingly, steps and configurations of the third embodiment not described below may be substantially the same as those of the first and second embodiments.

Figure 6:
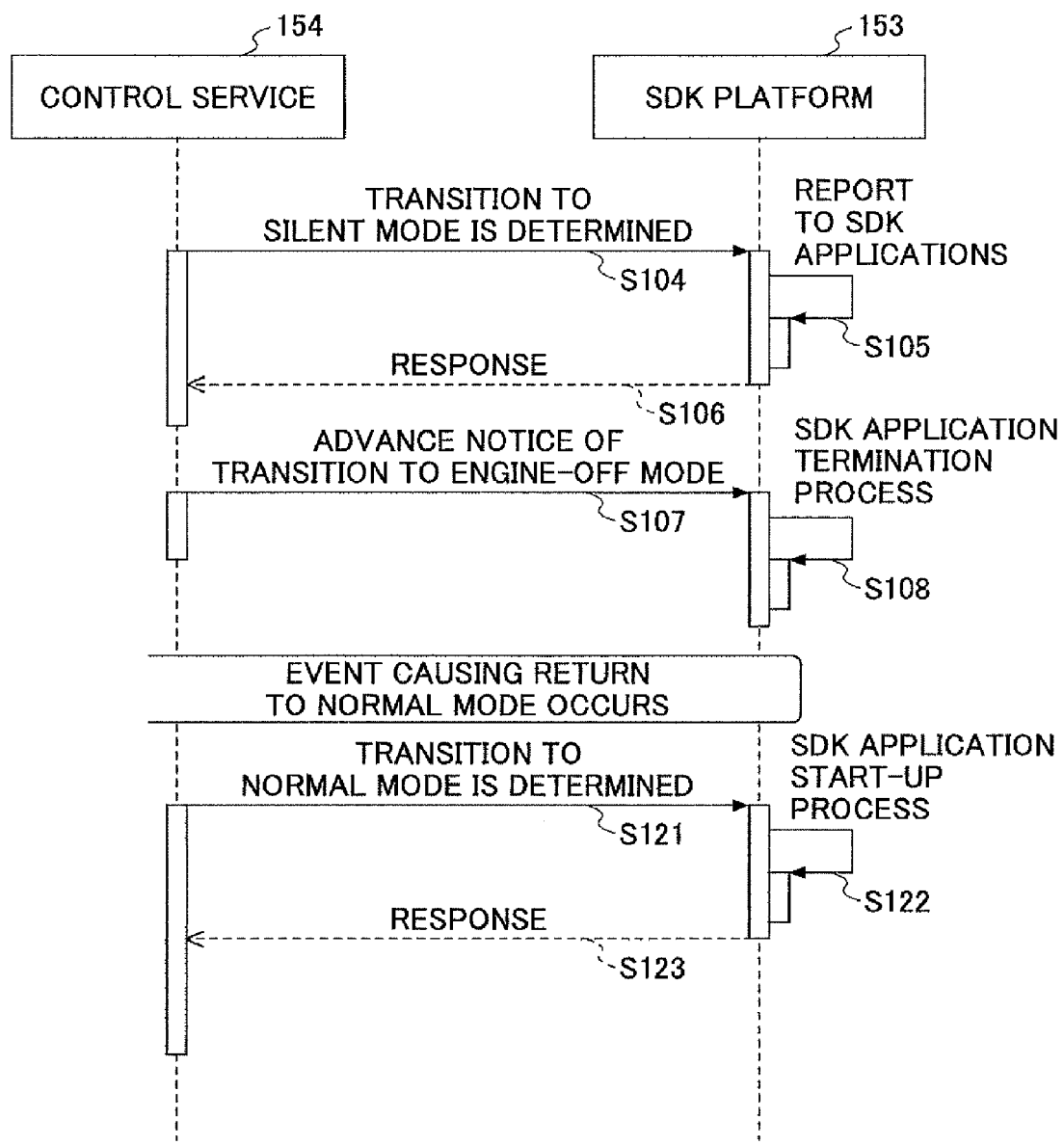
FIG. 6 is a sequence chart illustrating an exemplary process according to a third embodiment.

FIG. 6 is a sequence chart illustrating an exemplary process according to the third embodiment. The same reference numbers as in FIG. 4 are assigned to the corresponding steps in FIG. 6 and descriptions of those steps are omitted. Also an FIG. 6, steps S101 through S103 are omitted for brevity.

In the third embodiment, it is assumed that an event (e.g., the power key is pressed) causing the image forming device 10 to return to the normal mode ST1 occurs after the advance notice is sent (S107) and before the SDK platform 153 is queried whether transition to the engine-off mode ST3 is acceptable (S109).

When the event occurs, the transition control unit 161 reports to the SDK platform 153 that transition to the normal mode ST1 has been determined (S121). In response to the report, the SDK platform 153 performs a start-up process for starting the terminated SDK applications 152 (S122). After completing the start-up process, the SDK platform 153 sends a response (S123).

Thus, according to the third embodiment, even if the image forming device 10 is caused to return to the normal mode ST1 after the advance notice is sent and before the engine-off mode wait time passes, the SDK applications 152 that have been terminated in response to the advance notice are automatically restarted. This method or configuration makes it possible to reduce inconvenience to the user.

A fourth embodiment is described below. Here, steps and configurations that are different from the second embodiment are mainly described. Accordingly, steps and configurations of the fourth embodiment not described below may be substantially the same as those of the second embodiment.

Figure 7:
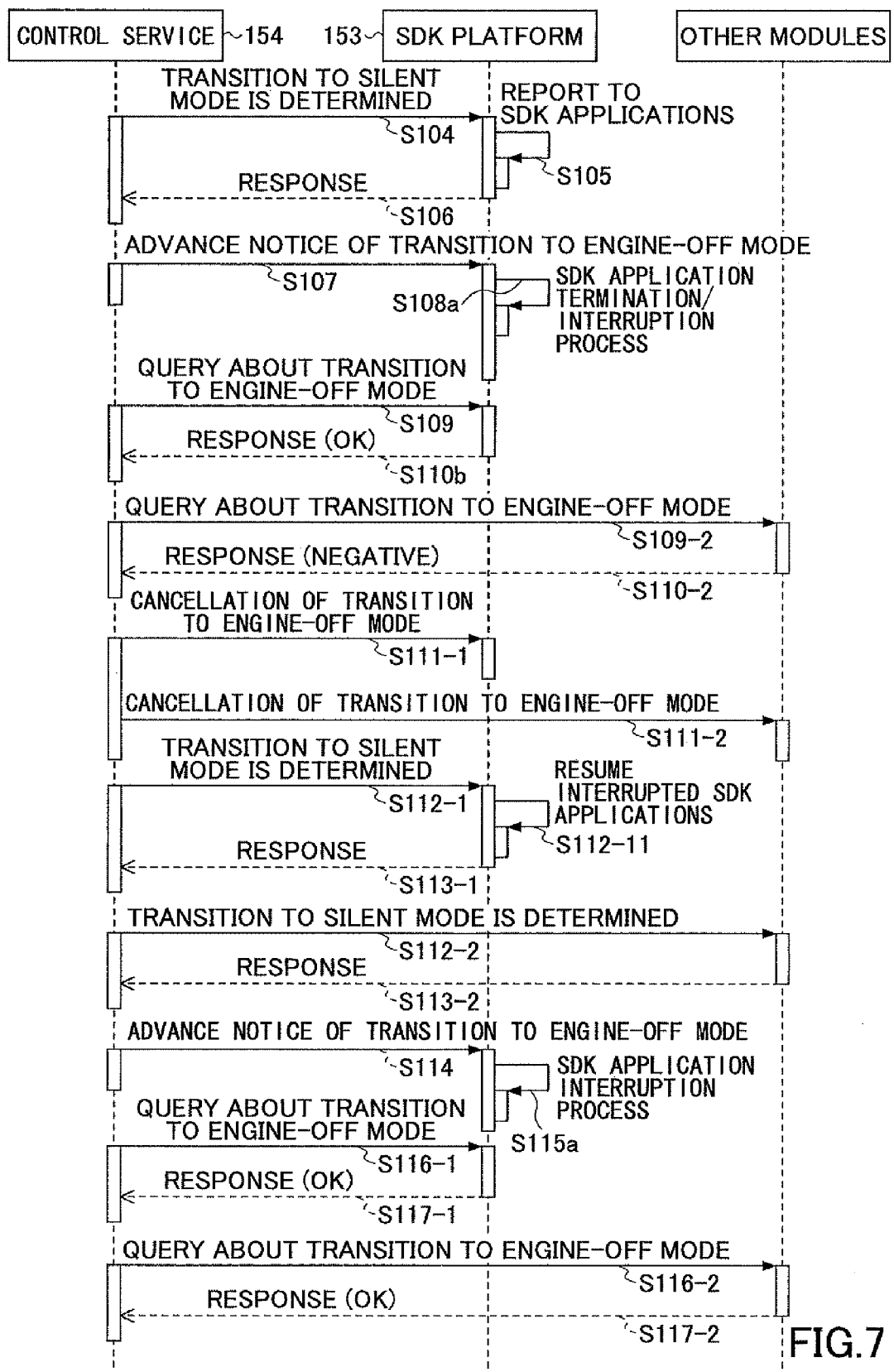
FIG. 7 is a sequence chart illustrating an exemplary process according to a fourth embodiment.

FIG. 7 is a sequence chart illustrating an exemplary process according to the fourth embodiment. The same reference numbers as in FIG. 5 are assigned to the corresponding steps in FIG. 7 and descriptions of those steps are omitted.

In FIG. 7, "other modules" indicate program modules (e.g., the standard applications 151) other than the SDK applications 152 and the SDK platform 153. The "other modules" may also be present in other embodiments, and similarly to the SDK platform 153, transition among operational modes may also be reported to the other modules.

In FIG. 7, step S108 of FIG. 5 is replaced with step S108a. In step S108a, the SDK platform 153 starts a termination process for terminating the running SDK applications 152. In step S108a, however, the SDK platform 153 inputs an interruption command, instead of the termination command, to each SDK application 152 that supports power-saving modes (hereafter called "power-saving-supported SDK application 152).

The power-saving-supported SDK application 152 is configured to be not terminated even when the image forming device 10 transitions to the engine-off mode ST3. For example, an SDK application 152 having a facsimile reception function needs to be running even in the engine-off mode ST3 and is therefore configured as a power-saving-supported SDK application 152. Information indicating whether an SDK application 152 supports power-saving modes may be recorded, for example, in the SDK platform 153 when the SDK application 152 is installed.

The interruption command causes the power-saving-supported SDK application 152 to interrupt a process currently being performed at an appropriate point. The thread of an interrupted SDK application 12 is not terminated.

Also in FIG. 7, step S110a of FIG. 5 is replaced with step S110b. In FIG. 7, it is assumed that all the SDK applications 152 have been terminated or interrupted at the timing when the SDK platform 153 is queried in step S109 whether transition to the engine-off mode ST3 is acceptable. Therefore, in step S110b, the SDK platform 153 sends a response indicating that transition to the engine-off mode ST3 is acceptable.

Next, the transition determining unit 163 also queries the other modules as to whether transition to the engine-off mode ST3 is acceptable (S109-2). Here, it is assumed that transition to the engine-off mode ST3 is not acceptable for at least one of the other modules. For example, transition to the engine-off mode ST3 is not acceptable for the print application 1512 when it is performing a print job or for the fax application 1514 when it is performing a facsimile transmission job or a facsimile reception job. Accordingly, at least one of the other modules sends a response indicating that transition to the engine-off mode ST3 is not acceptable (or allowed) (S110-2).

Thus, the fourth embodiment is different from the second embodiment in that transition to the engine-off mode ST3 is denied (not accepted) by at least one of the other modules.

When receiving a response indicating that the transition is not acceptable from at least one of the other modules, the transition control unit 161 reports to the SDK platform 153 and the other modules that transition to the engine-off mode ST3 has been cancelled (S111-1, S111-2).

Next, the transition control unit 161 reports to the SDK platform 153 that transition to the silent mode ST2 has been determined (S112-1). When receiving the report, the SDK platform 153 resumes the power-saving-supported SDK applications 152 that have been interrupted in step S108a (S112-11). As a result, the power-saving-supported SDK applications 152 return to a normal operational state. Next, the SDK platform 153 sends a response to the report to the transition control unit 161 (S113-1).

The transition control unit 161 also reports to the other modules that transition to the silent mode ST2 has been determined (S112-2). In response to the report, the other modules send responses to the transition control unit 161 (S113-2).

After a predetermined period of time from when the determination of transition to the silent mode ST2 is reported in step S112 (S112-1, S112-2) or from when the responses are sent in step S113 (S113-1, S113-2), the advance notification unit 162 again sends, to the SDK platform 153, an advance notice of transition to the engine-off mode ST3 (S114).

In response to the advance notice, the SDK platform 153 inputs the interruption command to the power-saving-supported SDK applications 152 (S115a). Since SDK applications 152 other than the power-saving-supported SDK applications 152 have already been terminated in step S108a, the termination process for those SDK applications 152 is not performed here.

When a predetermined period of time passes after the advance notice is sent in step S114, the transition determining unit 163 queries the SDK platform 153 as to whether transition to the engine-off mode ST3 is acceptable (S116-1). If all the power-saving-supported SDK applications 152 have been terminated when the SDK platform 153 is queried in step S116-1, the SDK platform 153 sends a response indicating that transition to the engine-off mode ST3 is acceptable (S117-1).

Then, the transition determining unit 163 queries the other modules whether transition to the engine-off mode ST3 is acceptable (S116-2). If transition to the engine-off mode ST3 is acceptable, the other modules send responses indicating that the transition is acceptable (S117-2).

Steps S116-1 and S116-2 may be performed in the reverse order or may be performed in parallel.

The fourth embodiment provides advantageous effects similar to those provided by the second embodiment.

A fifth embodiment is described below. Here, steps and configurations that are different from the third embodiment are mainly described. Accordingly, steps and configurations of the fifth embodiment not described below may be substantially the same as those of the third embodiment.

FIG. 8 is a sequence chart illustrating an exemplary process according to the fifth embodiment. The same reference numbers as in FIGS. 6 and 7 are assigned to the corresponding steps in FIG. 8 and descriptions of those steps are omitted.

In the fifth embodiment, it is assumed that the image forming device 10 transitions to an offline mode before a predetermined period of time passes after the advance notice of transition to the engine-off mode ST3 is sent in step S107.

In the offline mode, for example, parameters related to operations of the image forming device 10 are set and changed using a configuration screen for the administrator displayed on the operations panel 15. For example, the image forming device 10 transitions to the offline mode when a request to display the configuration screen for the administrator is entered. Accordingly, the offline mode is different in type from the power-saving modes illustrated in FIG. 3.

Since parameters of the image forming device 10 are set and changed in the offline mode, it is not preferable to cause the image forming device 10 to transition to the engine-off mode ST3 while it is in the offline mode. For example, since supply of power to the HDD 114 and/or the NVRAM 115 is stopped or reduced in the engine-off mode ST3, parameters set or changed in the offline mode cannot be recorded in the HDD 114 and/or the NVRAM 115.

For the above reason, when the image forming device 10 transitions to the offline mode, the transition control unit 161 stops a timer for measuring the passage of the predetermined period of time from when the advance notice of transition to the engine-off mode ST3 is sent. Next, the transition control unit 161 reports to the SDK platform 153 that transition to the silent mode ST2 has been determined (S121a). By reporting the determination of transition to the silent mode ST2, the transition control unit 161 reports to the SDK platform 153 that transition to the engine-off mode ST3 has been cancelled and thereby causes the SDK platform 153 and the SDK applications 152 to switch to an operational state corresponding to the current power-saving mode (i.e., the silent mode ST2) of the image forming device 10.

More specifically, when receiving the advance notice of transition to the engine-off mode ST3, the SDK platform 153 and the SDK applications 152 switch to an operational state (e.g., where the power-saving-supported SDK applications 152 are interrupted) corresponding to the engine-off mode ST3. If the determination of transition to the silent mode ST2 is not reported, the SDK platform 153 and the SDK applications 152 continue to be in the operational state corresponding to the engine-off mode ST3 even if the image forming device 10 is in the silent mode ST2 and therefore cannot work properly.

When the determination of transition to the silent mode ST2 is reported, the SDK platform 153 resumes the power-saving-supported SDK applications 152 that have been interrupted in step S108a (S122a). After resuming the power-saving-supported SDK applications 152, the SDK platform 153 sends a response (S123).

Thus, according to the fifth embodiment, even if the image forming device 10 is caused to transition to the offline mode after the advance notice is sent and before the engine-off mode wait time passes, the power-saving-supported SDK applications 152 that have been interrupted in response to the advance notice are automatically resumed. This method or configuration makes it possible to reduce inconvenience to the user.

In addition to the image forming device 10, the above embodiments may also be applied to any device such as a projector, a smartphone, a cell phone, or a digital camera having a power-saving mode.

An aspect of this disclosure provides a device, a power-saving control method, and a non-transitory computer-readable storage medium storing program code that make is possible to prevent reduction in the power-saving efficiency due to the increase in the number of installed programs.

The present invention is not limited to the specifically disclosed embodiments, and variations and modifications may be made without departing from the scope of the present invention.

What is claimed is:

1. A device having at least a first power-saving mode and a second power saving mode, comprising:
 a storage that stores a plurality of programs including a first program implementing a function of the device that needs to be kept active even in the second power-saving mode and a second program implementing a function of the device that does not need to be kept active in the second power-saving mode;
 a memory that stores program code; and
 a processor that executes the program code to implement
  an advance notification unit that sends an advance notice of transition to the second power-saving mode prior to transition start timing at which the transition to the second power-saving mode is started;
  a terminating unit that interrupts the first program in response to the advance notice and to terminate the second program in response to the advance notice;
  a transition determining unit that queries the terminating unit, at the transition start timing, whether the transition to the second power-saving mode is acceptable; and
  a transition control unit that causes the device to transition to the second power saving mode when the transition to the power-saving mode is acceptable, wherein
 the terminating unit determines that the transition to the second power-saving mode is acceptable when all of the programs have been either interrupted or terminated;
 when not all of the programs have been interrupted or terminated, the terminating unit determines that the transition to the second power-saving mode is not acceptable, and the transition control unit causes the device to transition to the first power saving mode;
 the advance notification unit sends the advance notice of transition to the second power-saving mode again after a first predetermined time period from transition of the device to the first power-saving mode; and
 the transition determining unit queries the terminating unit again whether the transition to the second power-saving mode is acceptable after a second predetermined time period from the transition of the device to the first power-saving mode.

2. The device as claimed in claim 1, wherein
 the first power-saving mode and the second power-saving mode have different power-saving levels.

3. A method performed by a processor of a device storing a plurality of programs and having at least a first power-saving mode and a second power saving mode, the method comprising:
 sending an advance notice of transition to the second power-saving mode prior to transition start timing at which the transition to the second power-saving mode is started;
 interrupting a first program of the programs in response to the advance notice and terminating a second program of the programs in response to the advance notice, the first program implementing a function of the device that needs to be kept active even in the second power-saving mode, and a second program implementing a function of the device that does not need to be kept active in the second power-saving mode;
 determining, at the transition start timing, whether the transition to the second power-saving mode is acceptable; and
 causing the device to transition to the second power saving mode when the transition to the second power-saving mode is acceptable, wherein
 the determining determines that the transition to the second power-saving mode is acceptable when all of the programs have been either interrupted or terminated;
 when not all of the programs have been interrupted or terminated, the determining determines that the transition to the second power-saving mode is not acceptable, and the device is caused to transition to the first power saving mode;
 the advance notice of transition to the second power-saving mode is sent again after a first predetermined time period from transition of the device to the first power-saving mode; and
 whether the transition to the second power-saving mode is acceptable is determined again after a second predetermined time period from the transition of the device to the first power-saving mode.

4. The method as claimed in claim 3, wherein
 the first power-saving mode and the second power-saving mode have different power-saving levels.

5. A non-transitory computer-readable storage medium storing program code for causing a device storing a plurality of programs and having at least a first power-saving mode and a second power saving mode to perform a method, the method comprising:
 sending an advance notice of transition to the second power-saving mode prior to transition start timing at which the transition to the second power-saving mode is started;
 interrupting a first program of the programs in response to the advance notice and terminating a second program of the programs in response to the advance notice, the first program implementing a function of the device that needs to be kept active even in the second power-saving mode, and a second program implementing a function of the device that does not need to be kept active in the second power-saving mode;
 determining, at the transition start timing, whether the transition to the second power- saving mode is acceptable; and
 causing the device to transition to the second power saving mode when the transition to the second power-saving mode is acceptable, wherein
 the determining determines that the transition to the second power-saving mode is acceptable when all of the programs have been either interrupted or terminated;
 when not all of the programs have been interrupted or terminated, the determining determines that the transition to the second power-saving mode is not acceptable, and the device is caused to transition to the first power saving mode;
 the advance notice of transition to the second power-saving mode is sent again after a first predetermined time period from transition of the device to the first power-saving mode; and
 whether the transition to the second power-saving mode is acceptable is determined again after a second predetermined time period from the transition of the device to the first power-saving mode.

6. The storage medium as claimed in claim 5, wherein
 the first power-saving mode and the second power-saving mode have different power-saving levels.

* * * * *